United States Patent
Dawson

(10) Patent No.: US 9,014,346 B2
(45) Date of Patent: *Apr. 21, 2015

(54) METHODS AND SYSTEMS FOR TOUCH-FREE CALL HANDLING

(75) Inventor: Jeffrey William Dawson, Stittsville (CA)

(73) Assignee: BCE Inc., Montreal (CA)

( * ) Notice: Subject to any disclaimer, the term of this patent is extended or adjusted under 35 U.S.C. 154(b) by 2196 days.

This patent is subject to a terminal disclaimer.

(21) Appl. No.: 11/534,425

(22) Filed: Sep. 22, 2006

(65) Prior Publication Data

US 2007/0121853 A1 May 31, 2007

Related U.S. Application Data

(63) Continuation of application No. PCT/CA2005/001457, filed on Sep. 23, 2005.

(51) Int. Cl.
| | |
|---|---|
| *H04M 1/64* | (2006.01) |
| *G10L 13/04* | (2013.01) |
| *H04M 1/57* | (2006.01) |
| *H04M 1/663* | (2006.01) |

(Continued)

(52) U.S. Cl.
CPC .............. *G10L 13/043* (2013.01); *H04M 1/578* (2013.01); *H04M 1/663* (2013.01); *H04M 3/42204* (2013.01); *H04M 3/436* (2013.01); *H04M 2203/2011* (2013.01); *H04M 2250/74* (2013.01); *Y10S 379/907* (2013.01)

(58) Field of Classification Search
USPC ........... 379/88.01–88.03, 212.01, 352, 88.04, 379/88.17, 907; 455/563, 417; 704/231, 704/246–250, E15.001–E15.007, E17.011; 340/5.52

See application file for complete search history.

(56) References Cited

U.S. PATENT DOCUMENTS

| 6,021,177 A | 2/2000 | Allport |
| 6,101,473 A | 8/2000 | Scott et al. |

(Continued)

FOREIGN PATENT DOCUMENTS

| JP | 2001339504 A | 12/2001 |
| WO | WO 01/35620 A1 | 5/2001 |

OTHER PUBLICATIONS

Office Action mailed on Dec. 21, 2009 in connection with Canadian Patent Application 2,570,695.

(Continued)

*Primary Examiner* — Md S Elahee
(74) *Attorney, Agent, or Firm* — Gowling Lafleur Henderson LLP

(57) ABSTRACT

A method, apparatus and computer-readable medium for handling incoming calls destined for a called party. The method comprises detecting arrival of an incoming call destined for the called party and attempting to reach the called party by causing a communication device associated with the called party to emit a voice message soliciting a spoken call handling command from the called party. This allows the called party not only to recognize the calling party, but also to decide whether to accept, reject or forward the incoming call without having to physically manipulate the communication device. The network-based example of implementation is compatible with many existing communication devices and has the ability to query the calling party for identification information, whereas the communication device-based example of implementation is compatible with many existing network architectures, and does not require the called party to subscribe to any particular network service.

70 Claims, 11 Drawing Sheets

(51) Int. Cl.
*H04M 3/42* (2006.01)
*H04M 3/436* (2006.01)

(56) References Cited

U.S. PATENT DOCUMENTS

| | | | |
|---|---|---|---|
| 6,160,877 | A | 12/2000 | Tatchell et al. |
| 6,212,408 | B1 * | 4/2001 | Son et al. ............ 455/563 |
| 6,438,216 | B1 | 8/2002 | Aktas |
| 6,505,163 | B1 | 1/2003 | Zhang et al. |
| 6,584,188 | B2 | 6/2003 | Kim |
| 6,631,179 | B1 | 10/2003 | Sifuentes |
| 6,633,846 | B1 | 10/2003 | Bennett et al. |
| 6,678,359 | B1 * | 1/2004 | Gallick ............ 379/88.17 |
| 6,728,671 | B1 | 4/2004 | Johnson |
| 6,799,098 | B2 | 9/2004 | Horst et al. |
| 7,120,241 | B1 * | 10/2006 | Fuoss et al. .......... 379/212.01 |
| 7,356,131 | B2 | 4/2008 | Bishop et al. |
| 7,437,148 | B1 * | 10/2008 | Vaghi et al. ............ 455/417 |
| 2002/0067245 | A1 | 6/2002 | Campbell et al. |
| 2002/0168063 | A1 | 11/2002 | Williams |
| 2002/0193989 | A1 | 12/2002 | Geilhufe et al. |
| 2004/0066916 | A1 * | 4/2004 | Brown et al. ............ 379/88.01 |
| 2004/0141597 | A1 | 7/2004 | Giacomelli |
| 2010/0215039 | A1 * | 8/2010 | Kent et al. ............ 370/352 |

OTHER PUBLICATIONS

PCT/CA2005/001456 (ISR), Jun. 1, 2006, BCE Inc.
PCT/CA2005/001457 (ISR), Jun. 29, 2006, BCE Inc.
PCT/CA2005/001942 (ISR), Jun. 29, 2006, BCE Inc.
Onstar, How Do I Use OnStar?, http://www.onstar.com/canada_english/jsp/explore/use_onstar.jsp, 2 pages.
Mobiletrax, Voice activated Services in Cell Phones: "Can You Understand Me Now?", Dec. 15, 2004, http://www.mobiletrax.com/im/2004archives/20041215.html, 3 pages.
Cartronics Inc., Verison Wireless, Keeping It Simple with the Kyocera KX444 PTT Phone, http://www.cartron.com/kyo_kx444.pdf, 5 pages.
Office Action issued by the United States Patent and Trademark Office on Dec. 9, 2010 in connection with U.S. Appl. No. 11/534,414, 17 pages.
Office Action issued by the United States Patent and Trademark Office on Dec. 20, 2010 in connection with U.S. Appl. No. 11/534,501, 17 pages.
Office Action mailed on Jun. 19, 2014 in connection with U.S. Appl. No. 11/534,501, 19 pages.

* cited by examiner

METHODS AND SYSTEMS FOR TOUCH-FREE CALL HANDLING

CROSS-REFERENCE TO RELATED APPLICATION

This application is a CONTINUATION of PCT International Patent Application Serial No. PCT/CA2005/001457, filed on Sep. 23, 2005, designating the United States of America, and hereby incorporated by reference herein.

FIELD OF THE INVENTION

The invention relates generally to telephonic communications and, more particularly, to a system and a method for facilitating how an incoming call is handled by a called party.

BACKGROUND OF THE INVENTION

Wireless communication devices, such as mobile phones and cordless phones, allow users to communicate while on the move. In addition, certain wireless communication devices, and particularly those equipped with a headset, allow users to converse while keeping their hands free.

While providing advantages in terms of mobility and hands-free communication, existing wireless communication devices present certain disadvantages. For example, a user may subscribe to a calling line identification (CLID) service in order to learn about a calling party from which an incoming call originates. However, in order to benefit from this feature, the user must normally glance at a display to obtain information about the calling party. In the specific case of a cordless phone having a base unit, this may require the user to move in proximity of the base unit if knowledge about the calling party is desired. This may be an inconvenience when the user is not in proximity of the base unit at the time when the incoming call arrives. In the specific case of a mobile phone used while driving a vehicle, observing the phone's display is a distraction that may represent a safety hazard.

Furthermore, whether or not CLID functionality is subscribed to, a user of a wireless communication device is normally required to physically touch or manipulate the device in some way in order to accept an incoming call, typically by pressing a button on the phone or flipping it open. While this may represent only a slight nuisance for some users, for other users such as call center agents, receptionists, stock brokers, etc., this limitation may negatively impact their efficiency in a business environment. Just as significantly, in the case of a mobile phone employed while driving a vehicle, physically manipulating the phone represents a further distraction which compounds the aforementioned risks arising from having to glance at a display for CLID purposes.

Thus, improvements directed to the convenience with which a user of a communication device can handle an incoming call would be welcomed.

SUMMARY OF THE INVENTION

In accordance with a first broad aspect, the invention seeks to provide a method of handling incoming calls destined for a called party. The method comprises detecting arrival of an incoming call destined for the called party, and attempting to reach the called party by causing a communication device associated with the called party to emit a voice message soliciting a spoken call handling command from the called party.

In accordance with a second broad aspect, the invention seeks to provide a computer readable storage medium containing a program element for execution by a functional entity to enable handling incoming calls destined for a called party. The program element includes program code means for detecting arrival of an incoming call destined for the called party, and program code means for attempting to reach the called party by causing a communication device associated with the called party to emit a voice message soliciting a spoken call handling command from the called party.

In accordance with a third broad aspect, the invention seeks to provide an apparatus for communication with a communication device associated with a called party. The apparatus comprises a controller adapted for detecting arrival of an incoming call destined for the called party, and a voice-activated call handling functional unit adapted for attempting to reach the called party by causing the communication device to emit an voice message soliciting a spoken call handling command from the called party.

In accordance with a fourth broad aspect, the invention seeks to provide a communication device, which comprises a network interface for communicating with a network entity over a portion of a network and a controller connected to the network interface, as well as a speaker and a microphone. The functional entity is adapted for detecting arrival of an incoming call via the network interface and attempting to reach a potential user of the communication device by causing the speaker to emit a voice message soliciting a spoken call handling command from the potential user of the communication device. Also, the functional entity receives a signal produced by the microphone and processes the signal in an attempt to detect a spoken call handling command potentially contained therein.

These and other aspects and features of the invention will now become apparent to those of ordinary skill in the art upon review of the following description of specific embodiments of the invention in conjunction with the accompanying drawings.

BRIEF DESCRIPTION OF THE DRAWINGS

A detailed description of specific embodiments of the invention is provided herein below, by way of example only, with reference to the accompanying drawings, in which.

Figure 1:
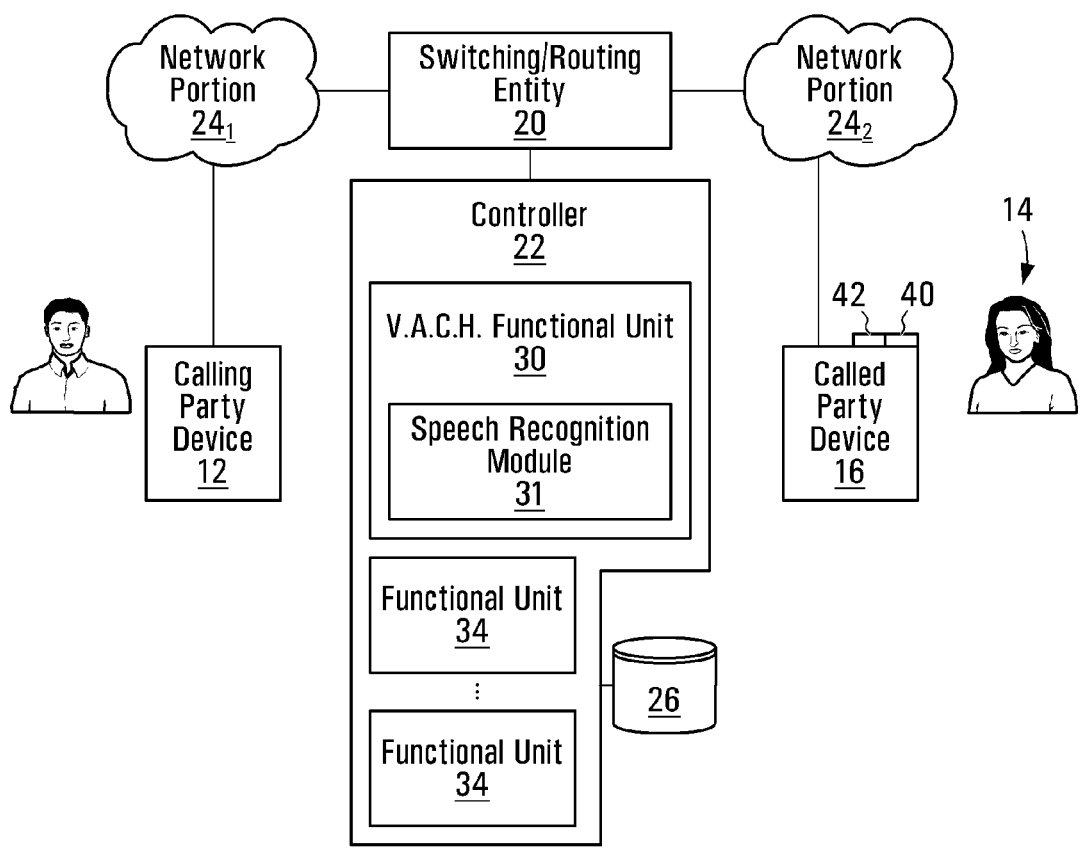
FIG. 1 is a conceptual block diagram showing various components in communication with one another, including a network entity equipped with voice-activated call handling functionality and a called party device, in accordance with an embodiment of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF EMBODIMENTS

Network-Based Example of Implementation

In the scenario to be described below with reference to FIG. 1, incoming calls destined for a called party 14 are received at a communication device 16 which is associated with the called party 14. The communication device 16 is equipped with a speaker 40 (which may be incorporated with an earphone), as well as a microphone 42. Alternatively, the speaker 40 may be external to the communication device 16 and subjected to control by the communication device 16.

The incoming calls originate from a calling party device 12, pass through a first network portion $24_1$, and arrive at a switching/routing entity 20, which exchanges signals with the communication device 16 over a second network portion $24_2$. The first network portion $24_1$, and the second network portion $24_2$ may each include a portion of the Public Switched Telephone Network (PSTN), a cellular network, a data network (such as the Internet), or a combination thereof The switching/routing entity is connected to a controller 22. The switching/routing unit 20 is operative to connect an incoming call arriving from the first network portion $24_1$, to the second network portion $24_2$. By passing through the second network portion $24_2$, the incoming call reaches the communication device 16. It is noted, however, that the party for which the incoming call is destined (viz., the called party 14) may or may not be available, and if available, may desire to handle the call in a particular manner. Accordingly, the switching/routing unit 20 is further operative to effect switching operations to provide a communication path between the controller 22 and the communication device 16 (via the second network portion $24_2$) and, if necessary, also between the controller 22 and the calling party device 12 (via the first network portion $24_1$), for the purposes of handling the incoming call. Generally, the switching/routing unit 20 may be implemented in hardware, firmware, software or a combination thereof In one specific non-limiting embodiment, the controller 22 may be located in a network entity that also houses the switching/routing entity 20, whereas in another specific non-limiting embodiment, the controller 22 may be located in a network entity that is different from that which houses the switching/routing entity 20. The controller 22 is connected to a database 26, which stores information regarding the association between the called party 14 and the communication device 16. Specifically, this association will depend on the nature of the communication device 16, the switching/routing entity 20 and the second network portion $24_2$.

More specifically, with reference to FIG. 10, the database 26 may comprise a plurality of records, each associated with a respective potential calling party, hereinafter referred to as a "user" for the sake of simplicity.

In one scenario for a hypothetical user denoted USER_1, the communication device 16 can be a POTS phone, the second network portion $24_2$ can be a telephone line in the PSTN that is reachable by dialing a particular telephone number, and the switching/routing entity 20 can be a central office switch. In this case, USER_1 has a business relationship with the PSTN service provider for the telephone line in question and thus is associated with any communication device 16 connected to that telephone line. The database 26 thus comprises a record 1002 which stores the association between the identity of USER_1, the particular telephone number and the "destination coordinates" (in this case, the identity of the telephone line in question).

In another scenario for a hypothetical user denoted USER_2, the communication device 16 can be a VoIP phone having a unique IP address and associated with a particular telephone number, the second network portion $24_2$ can be a virtual private network (VPN), and the switching/routing entity 20 can be a router. In this case, USER_2 is associated with the unique IP address of the VoIP phone. The database 26 thus comprises a record 1004 which stores the association between the identity of USER_2 IP, the particular telephone number and the "destination coordinates" (in this case, the address of the VoIP phone.)

In yet another scenario for a hypothetical user denoted USER_3, the communication device 16 can be a wireless phone having an electronic serial number (ESN) and associated with a particular telephone number, the second network portion $24_2$ can be a portion of a cellular network, and the switching/routing entity 20 can be a mobile switching center. In this case, USER_3 is associated with the ESN of the wireless phone. The database 26 thus comprises a record 1006 which stores the association between the identity of USER_3, the particular telephone number and the "destination coordinates" (in this case, the ESN of the wireless phone.)

Still other scenarios are possible, such as in the case of the communication device 16 being a soft phone (i.e. a computer equipped with telephony software). Accordingly, the database comprises may various other records (not shown) for storing the required associations between potential called parties, telephone numbers and destination coordinates.

In addition, the aforementioned records 1002, 1004, 1006 in the database 26 each include a list of communication services to which the respective user is subscribed. For incoming calls, examples of conventionally available services include calling line identification (CLID), voice mail, call waiting, call forwarding, automatic call answering, distinctive ringing, and so on. In addition, and in accordance with an embodiment of the present invention, the database 26 stores information on whether a particular user is subscribed to a "voice-activated call handling" (V.A.C.H.) service.

Figure 10:
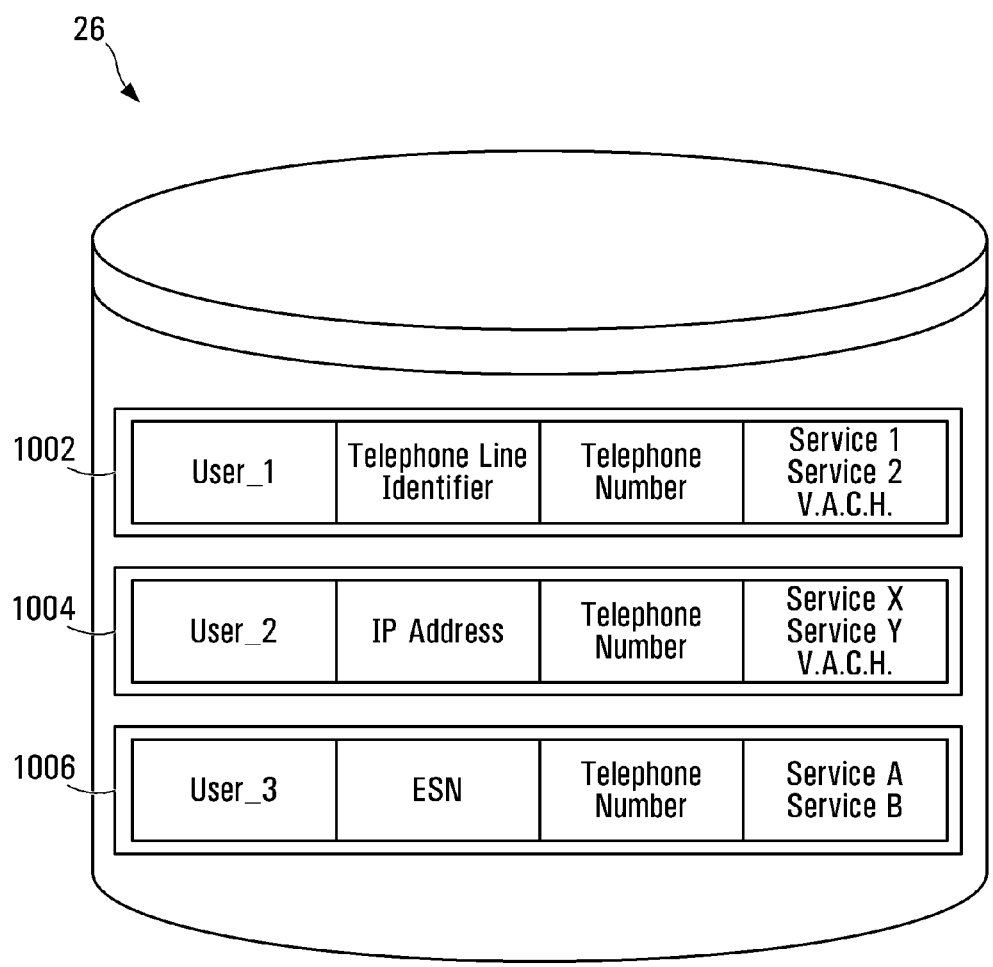
FIG. 10 conceptually illustrates the contents of a database in the network entity of FIG. 1.

In the specific non-limiting example illustrated in FIG. 10, the user identified in record 1002, namely USER_1, subscribes to "Service 1", "Service 2" and the voice-activated call handling (V.A.C.H.) service contemplated by the present invention. Also in this specific non-limiting example, the user identified in record 1004, namely USER_2, subscribes to "Service X", "Service Y" and the V.A.C.H. service contemplated herein. However, the user identified in record 1006, namely USER_3, subscribes to "Service A" and "Service B", but does not subscribe to the V.A.C.H. service contemplated herein. Of course, service subscription is completely independent from one user to the next and there is no restriction on the number or combination of services that may be subscribed to by any one user.

It should be understood that in various non-limiting embodiments, the database 26 can be co-located with the switching/routing entity 20, co-located with the controller 22, or located elsewhere altogether and reachable from the controller 22 via the first network portion $24_1$, the second network portion $24_2$, or a separate link or path.

Returning now to FIG. 1, the controller 22 comprises a set of functional units for managing the various services subscribed to by various users, including the services subscribed to by the called party 14. Functional units associated with conventionally available services 1 through N (e.g., CLID, voice mail, call waiting, call forwarding, automatic call answering, distinctive ringing) are denoted by the numeral 34. The functional unit associated with the voice-activated call handling service mentioned above is denoted by the numeral 30. For ease of reference, this functional unit 30 will hereinafter be referred to as a "voice-activated call handling functional unit" (or "V.A.C.H. functional unit") and denoted by the reference numeral 30. The V.A.C.H. functional unit 30, and, indeed, the controller 22 as a whole, may be implemented in hardware, firmware, software or a combination thereof.

The functional entities of the controller 22 are operative to interact with the switching/routing unit 20 and the database 26 in order to handle an incoming call destined for the called party 14. As will become apparent from the description below, the controller 22 detects the incoming call and attempts to reach the called party 14 by causing the communication device 16 to emit a voice message soliciting a spoken "call handling command" from the called party 14. This allows the called party 14 not only to recognize the calling party, but also to decide whether to accept, reject or forward the incoming call without having to physically manipulate the communication device 16.

Figure 2A:
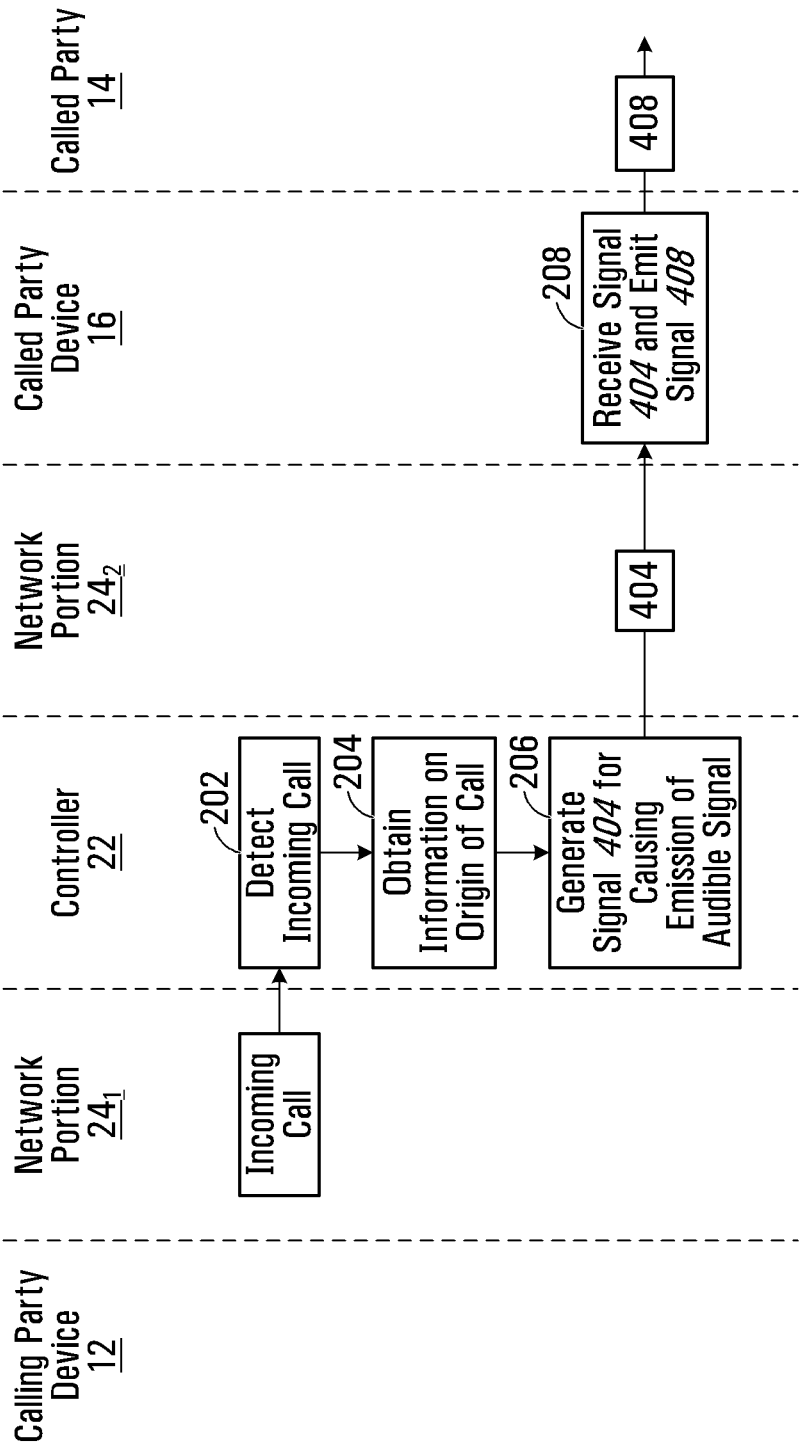
FIG. 2A is a signal flow diagram showing an exchange of signals leading to an attempt to reach a called party via the called party device.
Figure 2B:
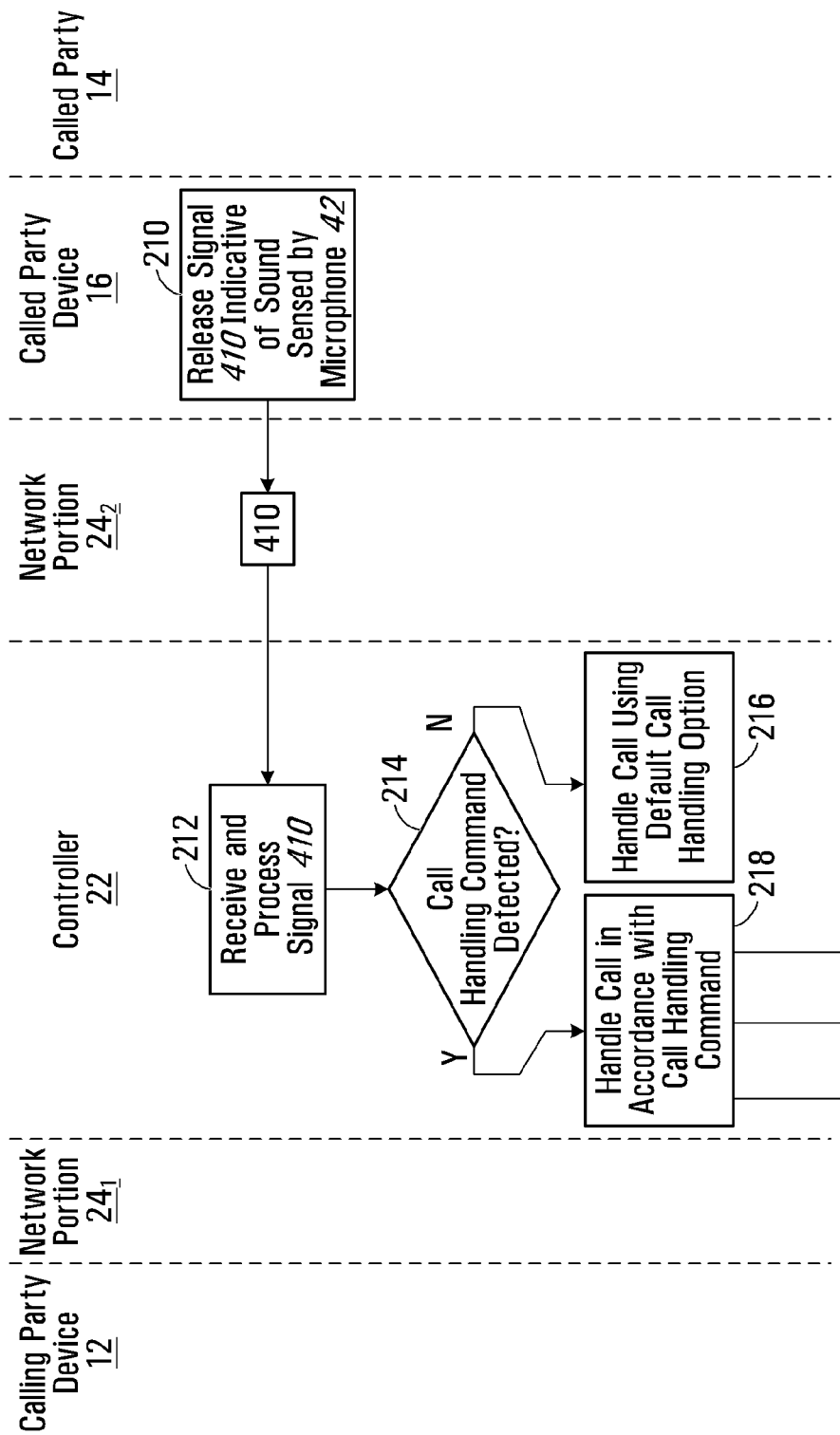
FIG. 2B is a signal flow diagram showing an exchange of signals resulting from a response provided by the called party, following from the signal flow diagram of FIG. 2A.

Accordingly, with reference now to FIGS. 2A and 2B, operation of the controller 22 in the context of an incoming call arriving via the first network portion $24_1$, will now be described.

Step 202

The controller 22 identifies the called party 14 for which the incoming call is destined. This can be determined from destination information that accompanies the incoming call. A non-limiting example of destination information is a subscriber telephone number.

In addition, the controller 22 consults the database 26 to determine if the called party 14 subscribes to one or more telephony services, including, specifically, the voice-activated call handling (V.A.C.H.) service.

If the called party 14 does not subscribe to the voice-activated call handling service, the call proceeds in a conventional manner. However, for the purposes of the present example, it is assumed that the called party 14 does indeed subscribe to the voice-activated call handling service. Having determined that the called party 14 subscribes to the voice-activated call handling service, the controller 22 passes control over to the V.A.C.H. functional unit 30.

Step 204

The V.A.C.H. functional unit 30 attempts to obtain information regarding an origin of the incoming call. To this end, and in a first non-limiting example embodiment, the V.A.C.H. functional unit 30 may use CLID information which may accompany the incoming call. Based on the CLID information, the V.A.C.H. functional unit 30 can obtain the identity of an associated calling party. In a second non-limiting example embodiment (not shown), the V.A.C.H. functional unit 30 sends a signal back towards the first network portion $24_1$, and the calling party device 12, requesting that the identity of the calling party be spoken or otherwise provided. When provided, the identity of the calling party is recorded in a memory (not shown) accessible to the V.A.C.H. functional unit 30.

Step 206

At this stage, the V.A.C.H. functional unit 30 attempts to reach the called party 14 over the second network portion $24_2$. Thus, the V.A.C.H. functional unit 30 consults the database 26 in order to learn how it should attempt to reach the called party 14.

For example, where the called party 14 is associated with an IP phone having an IP address (e.g., USER_2 in FIG. 10) or a wireless phone having an electronic serial number (e.g., USER_3 in FIG. 10), then the communication device 16 can be explicitly identified from the aforementioned subscriber telephone number.

On the other hand, where the called party 14 is associated with a telephone line identifier (e.g., USER_1 in FIG. 1), then the communication device 16 cannot be explicitly identified, but it is nevertheless known that the communication device 16 is reachable via the telephone line associated with the aforementioned subscriber telephone number.

Having thus determined how it can attempt to reach the called party 14 over the second network portion $24_2$, the V.A.C.H. functional unit 30 generates a signal 404 and sends the signal 404 over the second network portion $24_2$. In one embodiment, the signal 404 conveys a voice message that is reproduced by the speaker 40 at the communication device 16. In another embodiment, the signal 404 is a trigger that is recognized at the communication device 16 as being associated with a voice message for reproduction by the speaker 40 at the communication device 16. In an embodiment in which the V.A.C.H. functional unit 30 obtains CLID information about the incoming call, generation of the signal 404 may employ use of a text-to-speech conversion algorithm. In an embodiment in which a voice recording of the name or other identifier of the calling party is available to the V.A.C.H. functional unit 30, generation of the signal 404 may consist of playing back this recording.

Step 208

The signal 404 (which may have been reformatted by passage through the second network portion $24_2$) is received at the communication device 16. The communication device 16 is subsequently caused to emit a voice message 408 via the speaker 40. In accordance with an embodiment of the present invention, the voice message 408 is designed to solicit a spoken call handling command from the called party 14. Depending on the nature of the communication device 16, and specifically if the communication device is a POTS phone, the signal 404 may be operable to force the communication device 16 to acquire an off-hook state in order to allow emission of the voice message 408.

Assuming that the calling party has been identified as "John Doe", the voice message 408 may resemble "You have a call from John Doe; do you wish to take this call?"; "John Doe is calling; how would you like to handle this call?"; or any conceivable variant thereof. The speaker 40 may have volume adjustment capability so that the voice message 408 may be emitted with a volume sufficient to be heard up to several meters. In other cases, for example when the speaker 40 is incorporated with an earphone, volume adjustment may not be required. Of course, the communication device 16 may optionally also emit a ringing sound to accompany, precede or follow the voice message 408.

It should be noted that at the time when the voice message 408 is emitted, it is still not known whether the called party 14 can be reached, let alone whether the called party 14 is willing to accept the incoming call. Thus, it can be said that the V.A.C.H. functional unit 30 attempts to reach the called party 14 by emitting the voice message 408.

Step 210

Emission of the voice message 408 by the speaker 40 results in activation of the microphone 42 of the communication device 16. As a possible alternative, the microphone 42 may constantly be active. In either case, the microphone 42 is adapted to generate an internal signal indicative of sound sensed by the microphone 42. This internal signal causes a return signal 410 (e.g. an amplified and/or processed version of the internal signal) to be released by the communication device 16 towards the controller 22 via the second network portion $24_2$.

Step 212

The V.A.C.H. functional unit 30 receives the signal 410 and processes it.

Step 214

By processing the return signal 410, the V.A.C.H. functional unit 30 attempts to detect a call handling command potentially contained therein as a result of a spoken response to the voice message 408. To this end, the V.A.C.H. functional unit 30 implements a speech recognition module 31 adapted to detect several predetermined call handling commands that may be contained in the return signal 410. Data representing the predetermined call handling commands may be stored in a database (not shown) or other memory (not shown) accessible by the controller 22 and specifically the V.A.C.H. functional unit 30. Non-limiting examples of predetermined call handling commands that may be spoken include:

"yes", "accept" or "hello", conveying a desire of the called party 14 to take the incoming call;

"no" or "reject", conveying a desire of the called party 14 to not take the incoming call;

"forward to voice mail", conveying a desire of the called party 14 to forward the incoming call to a voice mail system; and "forward to alternate number", conveying a desire of the called party 14 to forward the incoming call to an alternate telephone number.

Of course, it is to be understood that these examples are in no way limiting and that various other predetermined call handling commands are possible without departing from the scope of the invention.

If the speech recognition module 31 determines that the return signal 410 contains no spoken response whatsoever to the voice message 408 after a predetermined period of time (e.g., 5 to 10 seconds), or if the spoken response provided by the called party 14 does not correspond to one of the predetermined call handling commands, then the V.A.C.H. functional unit 30 is deemed not to have detected a call handling command in the return signal 410. The V.A.C.H. functional unit 30 thus proceeds to step 216 and handles the incoming call in accordance with a default call handling option.

On the other hand, if the called party 14 does provide a timely spoken response to the voice message 408, and if the spoken response does correspond to one of the predetermined call handling commands recognizable by the speech recognition module 31, then the V.A.C.H. functional unit 30 proceeds to step 218 and handles the incoming call in accordance with the detected call handling command.

Step 216

If the calling party is still on the line, the V.A.C.H. functional unit 30 may cause emission from the speaker 40 of recurring voice messages each similar or identical to the voice message until the calling party hangs up (which can be detected by the controller 22). In another example, if the called party 14 subscribes to a voice mail service, then the appropriate one of the call handling functions 34 of the controller 22 may proceed to automatically forward the incoming call to a voice mail system. In yet another example, if the called party 14 subscribes to a call forwarding service, then the appropriate one of the call handling functions 34 of the controller 22 may proceed to automatically forward the incoming call to a suitable telephone number.

Step 218

Each of the predetermined call handling commands recognizable by the speech recognition module 31 is associated with a respective action to be performed by the controller 22 in cooperation with the switching/routing entity 20. Three specific non-limiting examples of actions performed by the controller 22 in cooperation with the switching/routing entity 20 based on the detected call handling command are presented below, with reference to FIGS. 3, 4 and 5, respectively.

Figure 3:
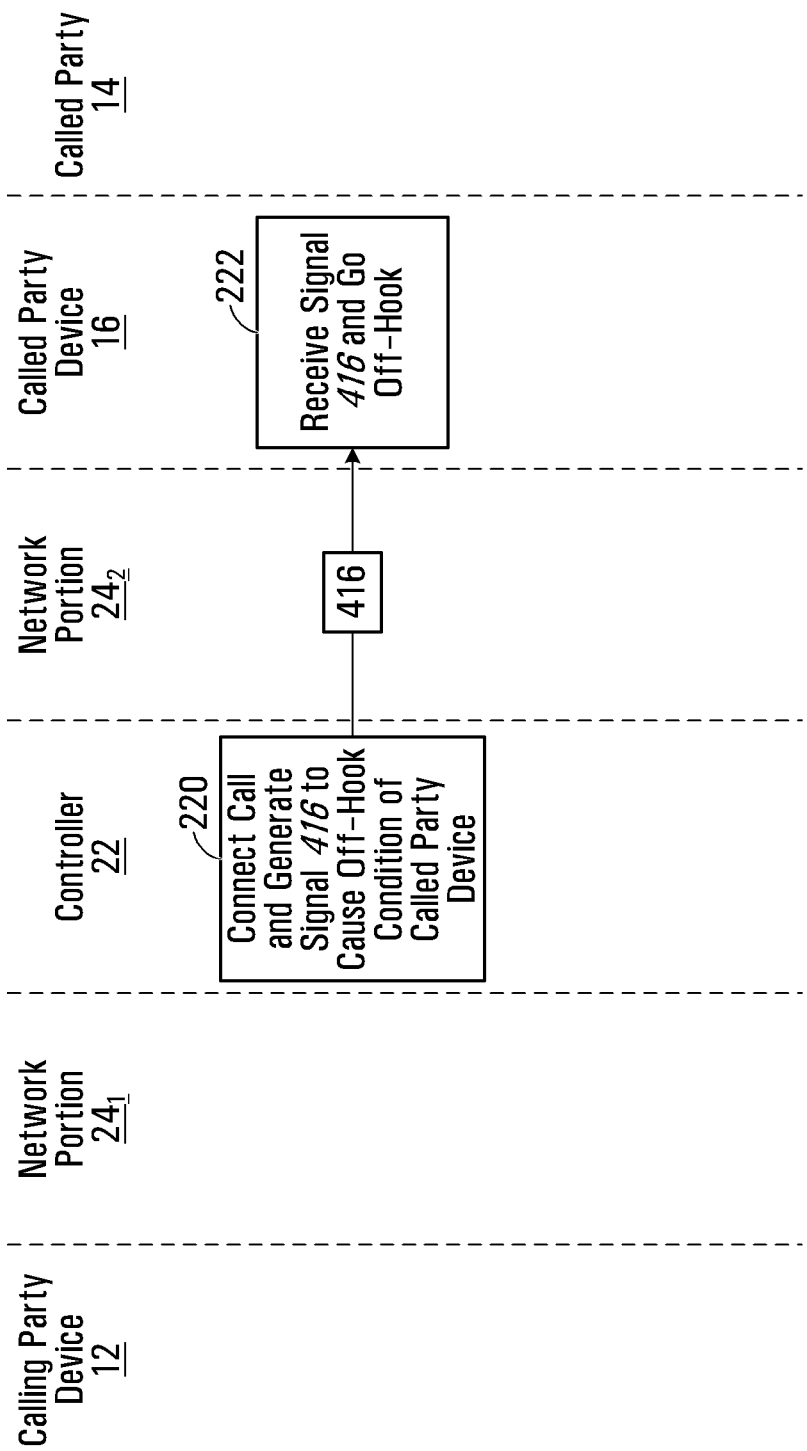
FIGS. 3-5 are signal flow diagrams showing an exchange of signals in accordance with various call handling options.

Called Party Accepts Incoming Call (FIG. 3)

In this example, it is assumed that the spoken response provided by the called party 14 resembles "yes", "accept" or "hello", which conveys a desire of the called party 14 to accept the incoming call. This can be referred to as a "call acceptance command". At step 220, the controller 22 proceeds to connect the incoming call to the communication device 16 by causing the switching/routing unit 20 to effect the appropriate connections, thereby establishing a voice communication path between the communication device 16 and the calling party device 12 via the switching/routing entity 20.

In addition, in the case where the communication device 16 remains in an on-hook state while relaying the response signal 410 to the controller 22, the controller 22 may release a further signal 416 towards the communication device 16, which causes the communication device 16 to acquire an off-hook state at step 222. Thus, the communication device 16 acquires the same state as if the called party 14 had actually answered the incoming call in a standard fashion, i.e., by touching the communication device 16 or pressing a button thereon.

Of course, if the communication device 16 had already been in an off-hook state when relaying the response signal 410 to the controller 22 (e.g., if the aforementioned signal 404 forces the communication device 16 to acquire an off-hook state), then generation of the signal 416 is not required.

Figure 4:
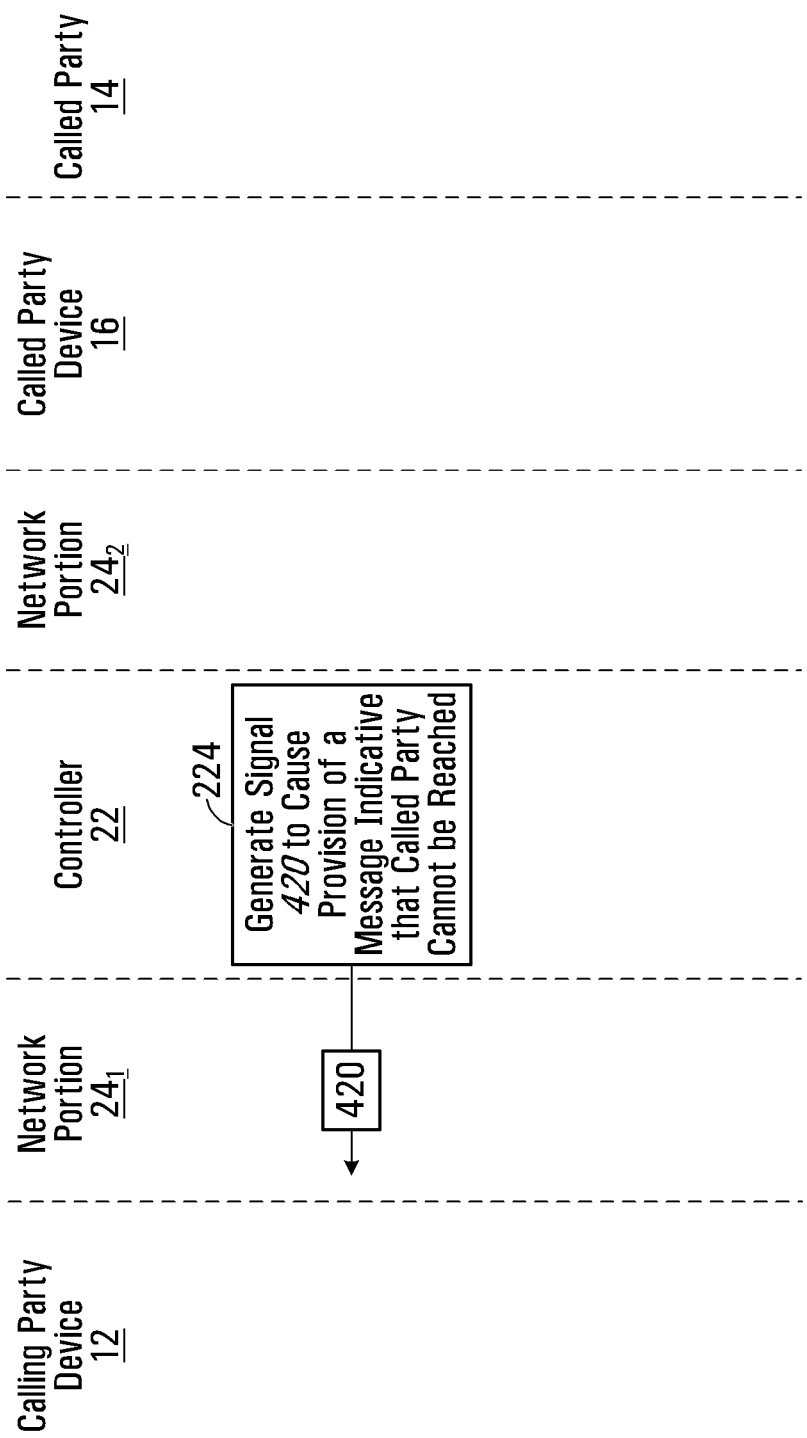

Called Party Rejects Incoming Call (FIG. 4)

In this example, it is assumed that the spoken response provided by the called party 14 resembles "no" or "reject", which conveys a desire of the called party 14 to not take the incoming call. This can be referred to as a "call rejection command". At step 224, the controller 22 proceeds to generate a signal 420, which is released into the first network portion 241. The purpose of the signal 420 is to indicate to the calling party that the called party 14 cannot be reached at this time. Furthermore, if the called party 14 subscribes to a voice mail service, then the appropriate one of the functional units 34 may be invoked in order to allow the calling party to leave a voice mail message for the called party 14. The remainder of the call may then be handled in a conventional manner.

Figure 5:
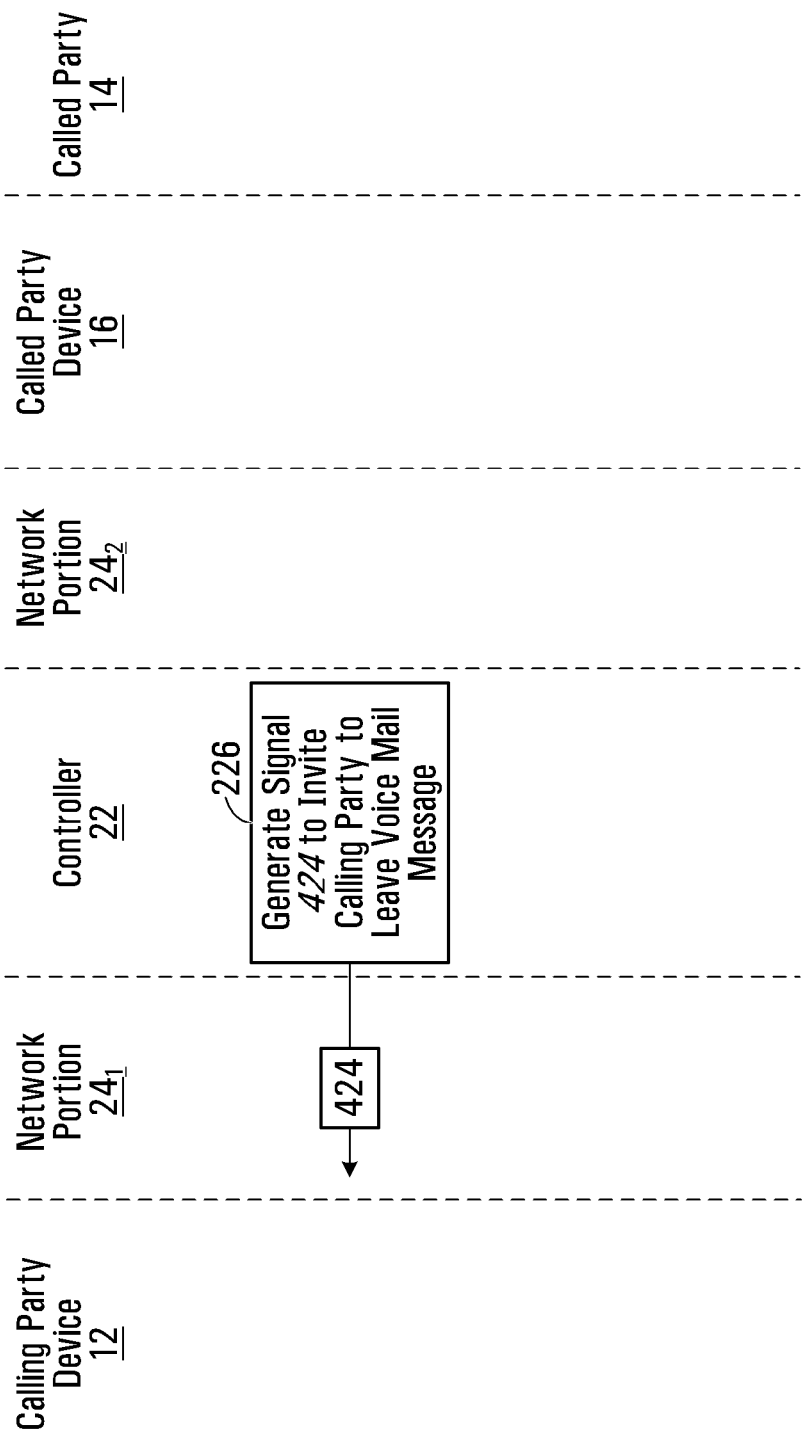

Called Party Forwards Incoming Call (FIG. 5)

In this example, it is assumed that the spoken response provided by the called party 14 resembles "forward to voice mail", which conveys a desire of the called party 14 to forward the incoming call to a voice mail system. This can be referred to as "call forwarding command". At step 226, the controller 22 proceeds to generate a signal 424, which is released into the first network portion 241. The purpose of the signal 424 is to invite the calling party to leave a voice mail message for the called party 14. Accordingly, the appropriate one of the function units 34 may be invoked in order to allow the calling party to leave a voice mail message for the called party 14. The remainder of the call may then be handled in a conventional manner.

It will also be appreciated that in other examples, the called party 14 may forward the incoming call in accordance with other telephony services to which the called party 14 may subscribe, by uttering the appropriate call handling command. For instance, if the called party 14 subscribes to a "call forwarding to alternate telephone number" service, the called party 14 may forward the incoming call to the alternate telephone number by uttering a call handling command such as "forward to office number" or any other command indicative of the alternate telephone number.

As is apparent from the above description, the controller 22 detects the incoming call and attempts to reach the called party 14 by causing the communication device 16 to emit via the speaker 40 a voice message 408 soliciting a spoken call handling command from the called party 14. This allows the called party 14 not only to learn the identity of the calling party, but also to decide whether to accept, reject or forward the incoming call without having to physically manipulate the communication device 16.

Communication Device-Based Example of Implementation

Figure 6:
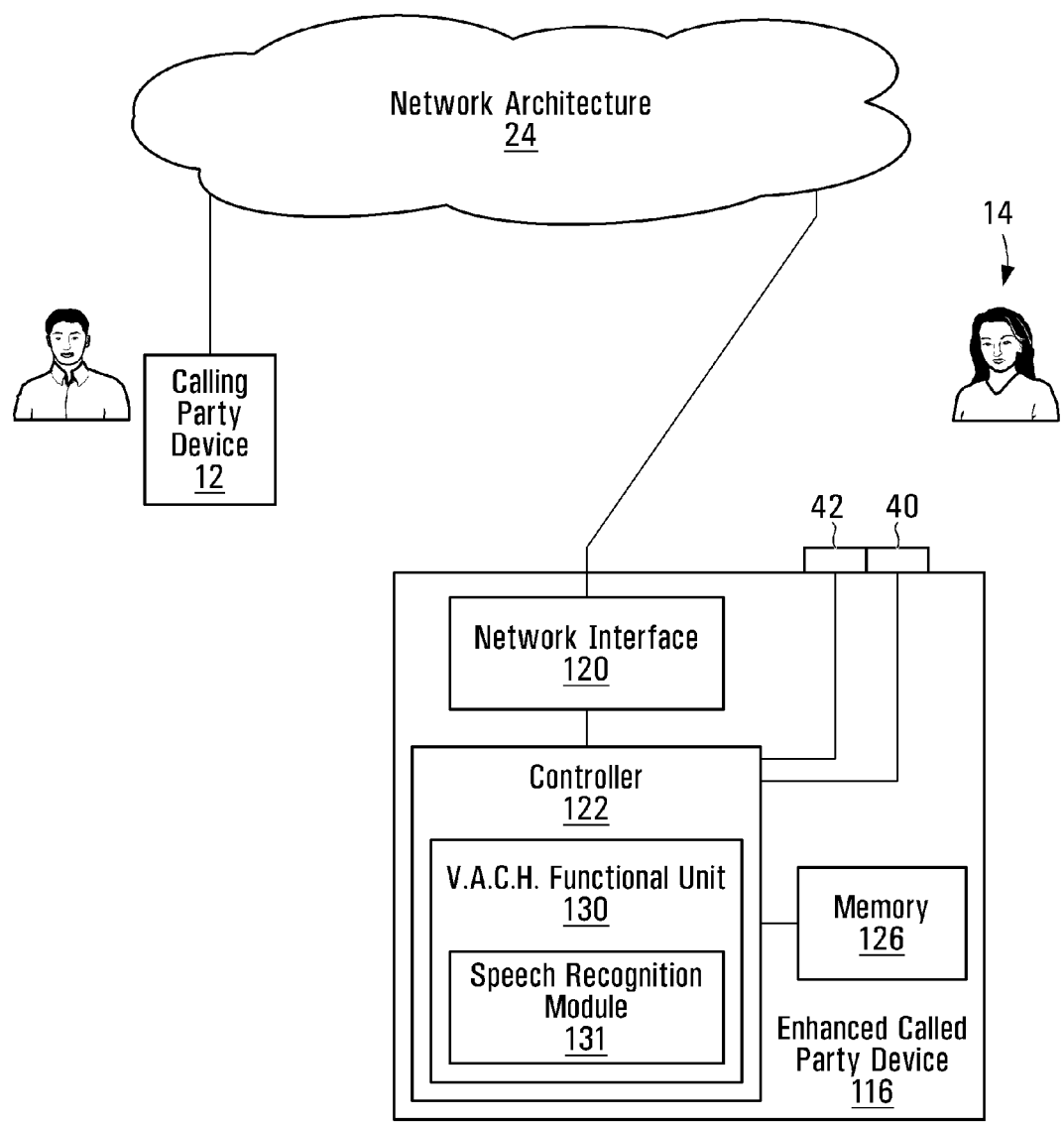
FIG. 6 is a conceptual block diagram principally showing an enhanced called party device equipped with voice-activated call handling functionality, in accordance with a second embodiment of the present invention.

In the scenario to be described below with reference to FIG. 6, incoming calls destined for the called party 14 are received at an enhanced communication device 116 associated with the called party 14. The incoming calls still originate from the previously mentioned calling party device 12, and pass through a network architecture 24, which may include, without limitation, portions of the public switched telephone network, a cellular network, a data network, or a combination thereof.

The enhanced communication device 116 is equipped with a speaker 40 (which may be incorporated with an earphone), as well as a microphone 42. Alternatively, the speaker 40 may be external to the enhanced communication device 116 and subjected to control by the enhanced communication device 116. The speaker 40 and the microphone 42 are conventionally available components and as such need not be described any further. In addition, the enhanced communication device also comprises a network interface 120, a memory 126 and a voice-activated call handling (V.A.C.H.) functional unit 130.

The memory 126 stores information that may be used by the V.A.C.H. functional unit 130 when an incoming call arrives at the enhanced communication device 116. In one non-limiting example embodiment, the memory 126 comprises a database of records where each record contains a first field and a second field. The first field, which can be viewed as an index, contains a name and/or telephone number in a format that is likely to be received from the network architecture 24 (such as a telephone number or listed name). The second field contains information that will be conveyed to the called party 14 in order to will assist the called party 14 in making a decision about whether to take the call.

For instance, a given example record in the memory 126 may comprise a first field containing the telephone number "(555) 555-5555" and a second field containing the alphanumeric text "John Smith". Another example record in the memory 126 may comprise a first field containing the name "John A. Smith" and a second field containing a speech segment that pronounces the words <John Smith>. Yet another example record in the memory 126 may comprise a first field containing the name "Dentistry Clinic ABC" and a second field containing a speech segment that pronounces the word <Dentist>. Of course, the foregoing are merely examples and those skilled in the art will appreciate that numerous variants are possible.

Figure 7:
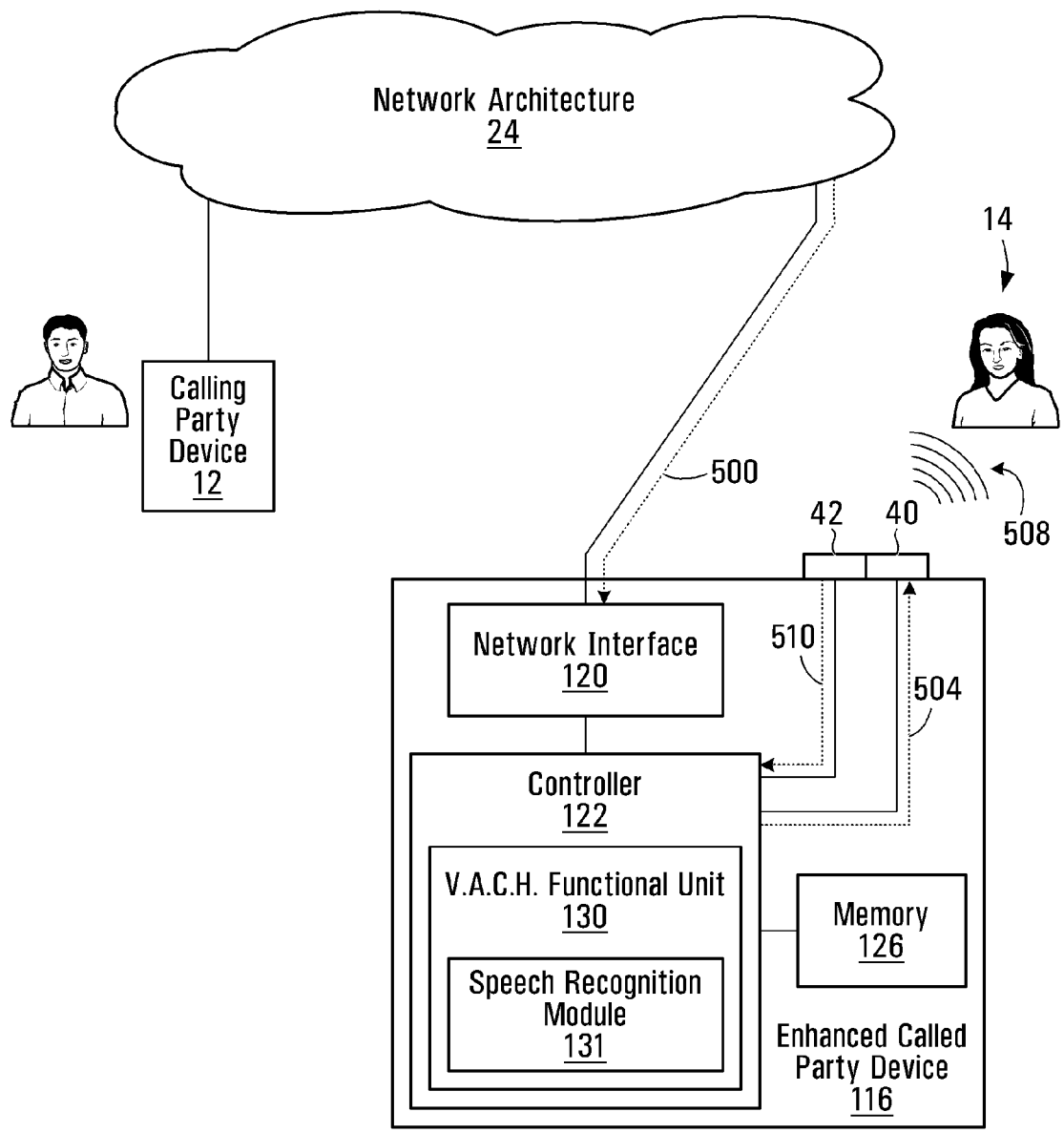
FIG. 7 is the block diagram of FIG. 6, showing an exchange of signals leading to an attempt to reach a called party via the called party device and as well as a response provided by the called party.

With reference now to FIG. 7, operation of the enhanced communication device 116 in the context of an incoming call arriving via the network architecture 24 will now be described. Accordingly, the network interface 120 receives from the network architecture 24 a signal 500 indicative of an incoming call destined for the called party 14. The V.A.C.H. functional unit 130 begins by obtaining information regarding an origin of the incoming call. For example, if the signal 500 contains CLID information, then obtaining information regarding an origin of the incoming call may simply amount to extracting the CLID information from the signal 500. In two non-limiting examples, the CLID information may be a telephone number or a listed name.

Based on the obtained information regarding the origin of the incoming call, the V.A.C.H. functional unit 130 consults the memory 126 in an attempt to identify a matching record having corresponding information in the first field.

Where no matching record is found in the database of records, and where the obtained information regarding the origin of the call is the telephone number "XYZ", the V.A.C.H. functional unit 130 may utilize text-to-speech conversion functionality to formulate a spoken query such as "You have a call from telephone number <XYZ>; do you wish to take this call?" or any conceivable variant thereof Where the obtained information regarding the origin of the call is the listed name "John A. Smith", the spoken query may simply resemble "You have a call from <John A. Smith>; do you wish to take this call?" or any conceivable variant thereof.

On the other hand, where a matching record is found in the database of records, the V.A.C.H. functional unit 130 proceeds to obtain the contents of the second field of the matching record and formulates a spoken query therefrom. For example, assuming the contents of the second field of the matching record to be the alphanumeric text "John Doe", the V.A.C.H. functional unit 130 may utilize text-to-speech conversion functionality to formulate a spoken query such as "You have a call from <John Doe>; do you wish to take this call?"; "<John Doe>is calling; how would you like to handle this call?"; or any conceivable variant thereof. Where the contents of the second field of the matching record is a voice segment, then this voice segment may be concatenated between a first pre-recorded speech segment such as <You have a call from>and a second pre-recorded speech segment such as <do you wish to take this call>, thereby resulting in the spoken query.

The spoken query is conveyed by an electronic signal 504 that is reproduced as a voice message 508 by the speaker 40. It will be seen that in the voice message 508 solicits a spoken call handling command from the called party 14. It should be noted that at the time when the voice message 508 is emitted, it is still not known whether the called party 14 can be reached, let alone whether the called party 14 is willing to accept the incoming call. Thus, it can be said that the V.A.C.H. functional unit 130 attempts to reach the called party 14 by emitting the voice message 508.

The speaker 40 may have volume adjustment capability so that the voice message 508 may be emitted with a volume sufficient to be heard up to several meters. In other cases, for example when the speaker 40 is incorporated with an earphone, volume adjustment may not be required. Of course, the enhanced communication device 116 may optionally also emit a ringing sound to accompany, precede or follow the voice message 508.

With continued reference to FIG. 7, following emission of the voice message 508 by the speaker 40, the V.A.C.H. functional unit 130 activates the microphone 42. As a possible alternative, the microphone 42 may constantly be active. The microphone 42 is adapted to generate a microphone signal 510 indicative of sound sensed by the microphone 42, and releases this microphone signal 510 to the V.A.C.H. functional unit 130.

The V.A.C.H. functional unit 130 receives the microphone signal 510 and processes it in an attempt to detect a call handling command which may be contained therein as a result of a spoken response to the voice message 508. To this end, the V.A.C.H. functional unit 130 implements a speech recognition module 131 adapted to detect several predetermined call handling commands that may be contained in the microphone signal 510. The reader is referred to the previous section for non-limiting examples of predetermined call handling commands that may be spoken. Data representing the predetermined call handling commands may be stored in the memory 126 or in another entity (not shown) accessible by the V.A.C.H. functional unit 130.

If the speech recognition module 131 determines that the microphone signal 510 contains no spoken response whatsoever to the voice message 508 after a predetermined period of time (e.g., 5 to 10 seconds), or if the spoken response provided by the called party 14 does not correspond to one of the predetermined call handling commands, then the V.A.C.H. functional unit 130 is deemed not to have detected call a handling command in the microphone signal 510. The V.A.C.H. functional unit 130 thus proceeds to handle the incoming call in accordance with a default call handling option.

For example, if the calling party is still on the line, the V.A.C.H. functional unit 130 may cause emission from the speaker 40 of recurring voice messages each similar or identical to voice message 508. Meanwhile, the calling party would continue to hear a ringing sound. The calling party may at some point become decide to hang up or, if the called party 14 subscribes to a voice mail service or call forwarding service, the call may be transferred to a voice mail system or alternate number; in either case, the disappearance of the incoming call would be detected by the enhanced communication device 116 by way of a change in, or disappearance of, the signal 500.

For the purposes of this example, however, it is assumed that the called party 14 does provide a timely spoken response to the voice message 508, which spoken response does correspond to one of the predetermined call handling commands recognizable by the speech recognition module 131. Under these conditions, the V.A.C.H. functional unit 130 proceeds to handle the incoming call in accordance with the detected call handling command. More specifically, each of the predetermined call handling commands recognizable by the speech recognition module 131 is associated with a respective action to be performed by the enhanced communication device 116.

Examples of actions performed by the enhanced communication device 116 based on the detected call handling command are presented below.

Called Party Accepts Incoming Call

Figure 8:
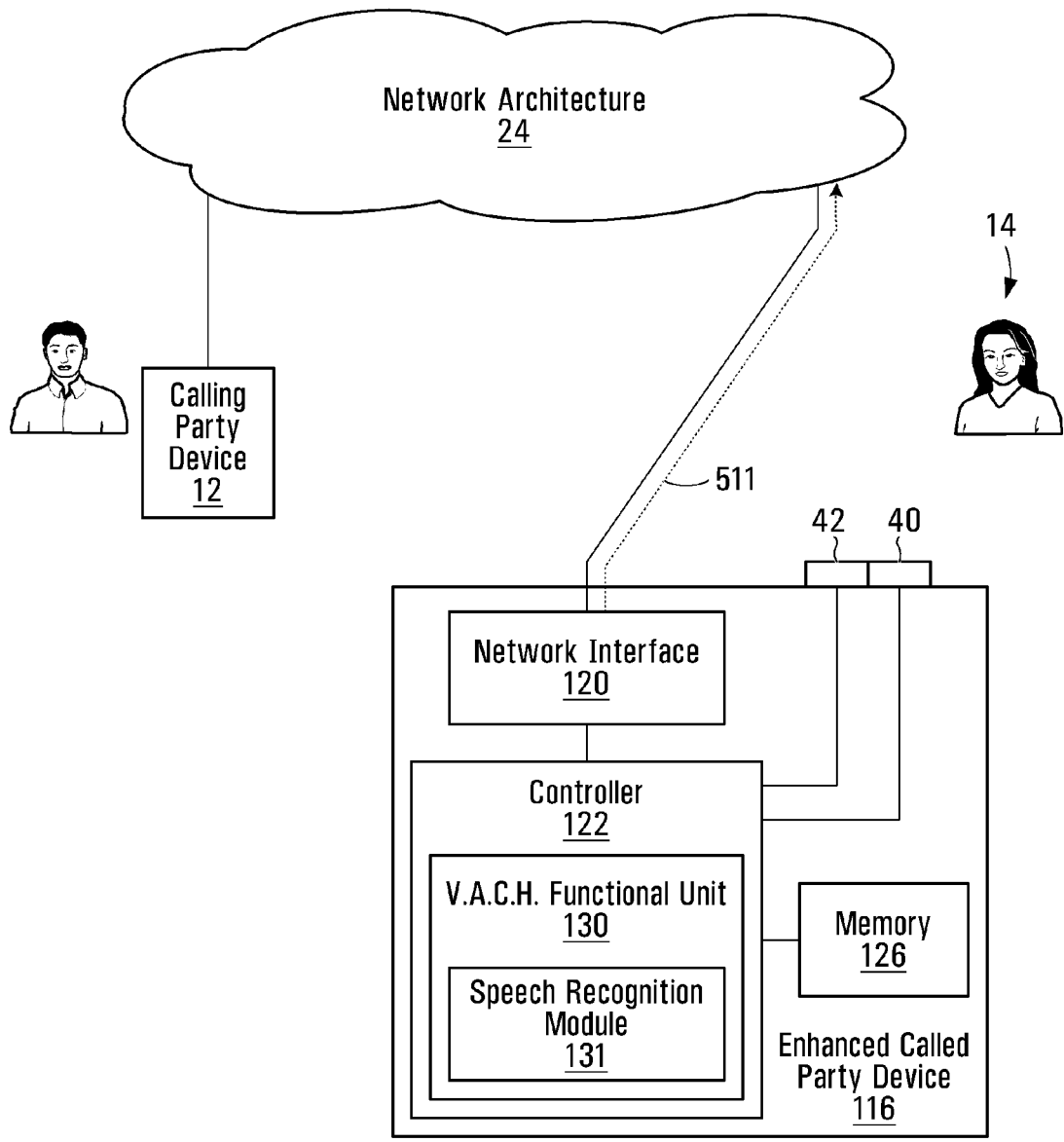
FIG. 8 is the block diagram of FIG. 6, showing an exchange of signals in accordance with a specific call handling option.

In this example, which is depicted in FIG. 8, it is assumed that the spoken response provided by the called party 14 resembles "yes", "accept" or "hello", which conveys a desire of the called party 14 to accept the incoming call. This can be referred to as a "call acceptance command". Thus, the V.A.C.H. functional unit 130 causes the network interface 120 to send to the network architecture 24 a signal 511 simulating an off-hook state in the enhanced communication device 116. This gives the network architecture 24 the impression that someone has lifted a receiver or pressed a button of the enhanced communication device 116. Responsive to receipt of the signal 511, the network architecture 24 will support the call between the calling party and the called party 14 until one of the two parties hangs up.

Called Party Rejects Incoming Call

Figure 9:
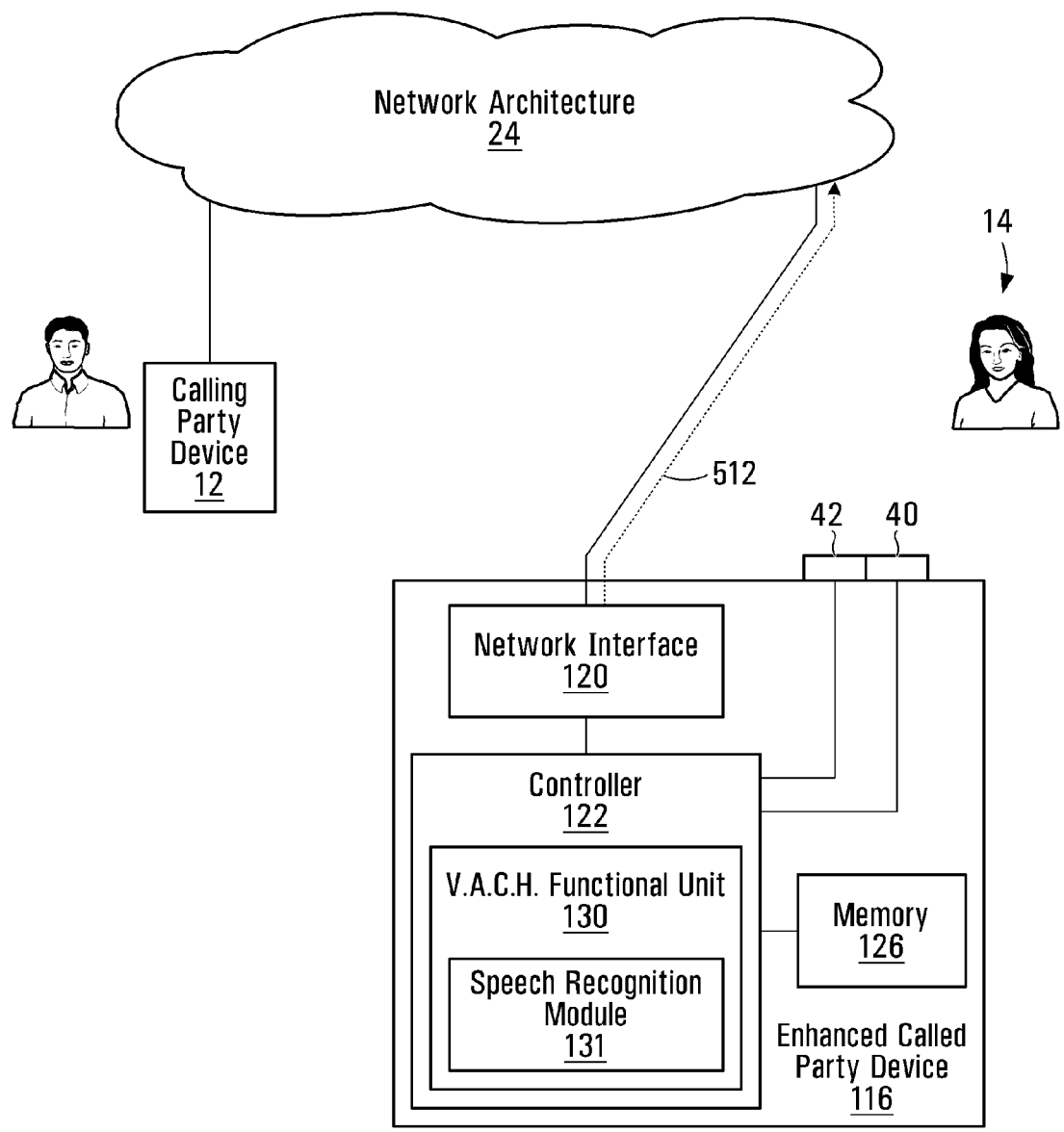
FIG. 9 is the block diagram of FIG. 6, showing an exchange of signals in accordance with a different specific call handling option.

In this example, which is depicted in FIG. 9, it is assumed that the spoken response provided by the called party 14 resembles "no" or "reject", which conveys a desire of the called party 14 to not take the incoming call. This can be referred to as a "call rejection command". Firstly, the V.A.C.H. functional unit 130 concludes that the called party 14 does not want to take the call and can do one of two things. In the first case, no action is taken, whereby the calling party will keep obtaining a ringing signal until the calling party hangs up or the called party's voice mail/call forwarding service is activated. In the second case, the V.A.C.H. functional unit 130 causes the network interface 120 to send a signal 512 that effectively disconnects the incoming call.

Called Party Forwards Incoming Call

In this example, which is not illustrated in the drawings, it is assumed that the spoken response provided by the called party 14 resembles "forward to voice mail", which conveys a desire of the called party 14 to forward the incoming call to a voice mail system (assuming that the called party 14 subscribes to such a service). This can be referred to as a "call forwarding command". Here, the V.A.C.H. functional unit 130 causes the network interface 120 to send a signal that is understood by the network architecture 24 as being a forwarding command. Responsive to receipt of this signal, the network architecture 24 will transfer the call to the voice mail system.

It will also be appreciated that in other examples, the called party 14 may forward the incoming call in accordance with other telephony services to which the called party 14 may subscribe, by providing the appropriate call handling command understood by the network architecture 24. For instance, if the called party subscribes to a "call forwarding to an alternate telephone number" service, the called party 14 may forward the incoming call to the alternate telephone number by uttering a call handling command such as "forward to office number" or any other command indicative of the alternate telephone number.

As is apparent from the above description, the V.A.C.H. functional unit 130 detects the incoming call and attempts to reach the called party 14 by causing the enhanced communication device 116 to emit via the speaker 40 a voice message 508 soliciting a spoken call handling command from the called party 14. This allows the called party 14 not only to learn the identity of the calling party, but also to decide whether to accept, reject or forward the incoming call without having to physically manipulate the enhanced communication device 116.

The above description has presented two possible non-limiting examples of implementation of the present invention enabling a called party associated with a communication device to gain knowledge about an incoming call and to handle the incoming call without physically contacting the communication device, by way of voice messages exchanged between the called party and the communication device. A network-based example of implementation was first considered, followed by a communication device-based example of implementation, each with its own specific particularities. For instance, the network-based example of implementation is compatible with many existing communication devices and has the ability to query the calling party for identification information; on the other hand, the communication device-based example of implementation is compatible with many existing network architectures, and does not require the called party to subscribe to any particular network service. It is to be understood that these examples of implementation are in no way limiting and that various other examples of implementation are possible without departing from the scope of the present invention.

Those skilled in the art will appreciate that in some embodiments, certain functionality of the controller 22 and/or the enhanced communication device 116 may be implemented as pre-programmed hardware or firmware elements (e.g., application specific integrated circuits (ASICs), electrically erasable programmable read-only memories (EEPROMs), etc.), or other related components. In other embodiments, the controller 22 and/or the enhanced communication device 116 may comprise an arithmetic and logic unit (ALU) having access to a code memory (not shown) which stores program instructions for the operation of the ALU in order to execute the various processes described above. The program instructions could be stored on a medium which is fixed, tangible and readable directly by the controller 22 and/or the enhanced communication device 116, (e.g., removable diskette, CD-ROM, ROM, fixed disk, USB drive, etc.), or the program instructions could be stored remotely but transmittable to the controller 22 and/or the enhanced communication device 116 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Although various embodiments have been illustrated, this was for the purpose of describing, but not limiting, the invention. Various modifications will become apparent to those skilled in the art and are within the scope of the present invention, which is defined more particularly by the attached claims.

What is claimed is:

1. A method of handling incoming calls destined for a called party, the called party being associated with a communication device, said method being implemented by a network entity connected to the communication device via a communications network, said method comprising:
   detecting arrival of an incoming call destined for the called party;
   attempting to reach the called party by sending a signal to the communication device over the communications network to cause the communication device to emit a voice message soliciting a spoken call handling command from the called party;
   receiving a signal from the communication device; and
   at the network entity, determining, based on the signal received from the communication device, whether a spoken call handling command has been uttered at the communication device before the call being answered by the called party.

2. The method defined in claim 1, further comprising:
   receiving information regarding an origin of the incoming call;
   wherein the voice message conveys said information regarding an origin of the incoming call.

3. The method defined in claim 2, further comprising formulating the voice message by text-to-speech conversion of said information regarding an origin of the incoming call.

4. The method defined in claim 3, wherein said information regarding an origin of an incoming call is derived from CLID information.

5. The method defined in claim 4, wherein said information regarding an origin of an incoming call comprises a telephone number.

6. The method defined in claim 4, wherein said information regarding an origin of an incoming call comprises a name.

7. The method defined in claim 2, wherein the incoming call originates from a calling party, the method further comprising prompting the calling party to provide said information regarding an origin of the incoming call.

8. The method defined in claim 1, further comprising:
   receiving information regarding an origin of the incoming call;
   consulting a database to obtain information associated with said information regarding the origin of the incoming call;
   wherein the voice message conveys said associated information.

9. The method defined in claim 8, wherein said associated information comprises text, the method further comprising formulating the voice message by text-to-speech conversion of said associated information.

10. The method defined in claim 8, wherein said associated information comprises a speech segment, the method further comprising formulating the voice message by concatenating the speech segment with other speech segments.

11. The method defined in claim 1, wherein the signal is produced by a microphone at the communication device and said determining comprises processing the signal in an attempt to detect a spoken call handling command potentially contained therein.

12. The method defined in claim 11, wherein processing the signal comprises applying speech recognition to recognize one out of a plurality of possible spoken handling commands.

13. The method defined in claim 11, further comprising:
   responsive to detection of a specific spoken call handling command in the signal, handling the incoming call in accordance with the specific spoken call handling command.

14. The method defined in claim 13, wherein the incoming call originates from a calling party, wherein the specific spoken call handling command is a command to answer the call and wherein said handling the incoming call in accordance with the specific spoken call handling command comprises establishing a voice communication path between the calling party and the called party.

15. The method defined in claim 14, further comprising sending a signal to cause the communication device to acquire an off-hook state to allow the voice communication path to be established.

16. The method defined in claim 13, wherein the incoming call originates from a calling party, wherein the specific spoken call handling command is a command to reject the call and wherein handling the incoming call in accordance with the specific spoken call handling command comprises signaling to the calling party that communication with the called party cannot be established.

17. The method defined in claim 13, wherein the incoming call originates from a calling party, wherein the specific spoken call handling command is a command to forward the call to an entity other than the called party and wherein handling the incoming call in accordance with the specific spoken call handling command comprises establishing voice communication path between the calling party and the entity other than the called party.

18. The method defined in claim 17, wherein the entity other than the called party is a voice mail system.

19. The method defined in claim 1, wherein causing the communication device to emit the voice message comprises sending an electronic signal to the communication device, the electronic signal conveying the voice message.

20. The method defined in claim 1, wherein causing the communication device to emit the voice message comprises sending a trigger to the communication device to cause the communication device to emit the voice message.

21. The method defined in claim 1, further comprising sending a signal to cause the communication device to acquire an off-hook state to allow the communication device to emit the voice message.

22. The method defined in claim 1, further comprising identifying the called party.

23. The method defined in claim 1, further comprising identifying the called party from a destination telephone number associated with the incoming call.

24. The method defined in claim 1, further comprising determining whether the called party subscribes to a service that enables calls to be handled by the called party in a touch-free manner.

25. The method defined in claim 24, wherein causing the communication device to emit the voice message is performed only if said determining step is positive.

26. A non-transitory computer-readable storage medium containing a program element for execution by a functional unit of a network entity to enable handling incoming calls destined for a called party, the called party being associated with a communication device, the network entity being connected to the communication device via a communications network, the program element including:
 program code means for detecting arrival of an incoming call destined for the called party;
 program code means for attempting to reach the called party by sending a signal to the communication device over the communications network to cause the communication device to emit a voice message soliciting a spoken call handling command from the called party;
 program code means for receiving a signal from the communication device: and
 program code means for determining, at the network entity, based on the signal received from the communication device, whether a spoken call handling command has been uttered at the communication device before the call being answered by the called party.

27. Apparatus for communication with a communication device associated with a called party via a communications network, the apparatus comprising:
 a controller adapted for detecting arrival of an incoming call destined for the called party; and
 a voice-activated call handling functional unit adapted for:
  attempting to reach the called party by sending a signal to the communication device over the communications network to cause the communication device to emit a voice message soliciting a spoken call handling command from the called party;
  receiving a signal from the communication device; and
  determining, based on the signal received from the communication device, whether a spoken call handling command has been uttered at the communication device before the call being answered by the called party.

28. The apparatus defined in claim 27, the controller being further adapted for obtaining information regarding a destination of the incoming call.

29. The apparatus defined in claim 28, further comprising a database for maintaining an association between destination telephone numbers and destination coordinates.

30. The apparatus defined in claim 29, wherein said information regarding a destination of the incoming call comprises a particular destination telephone number associated with the incoming call.

31. The apparatus defined in claim 30, the controller being further adapted for consulting said database in an attempt to obtain the destination coordinates corresponding to the particular destination telephone number.

32. The apparatus defined in claim 31, the communication device having an IP address, the destination coordinates corresponding to the particular destination telephone number being indicative of the IP address of the communication device.

33. The apparatus defined in claim 32, the communication device having an electronic serial number, the destination coordinates corresponding to the particular destination telephone number being indicative of the electronic serial number of the communication device.

34. The apparatus defined in claim 33, the communication device being reachable via a PSTN telephone line, the destination coordinates corresponding to the particular destination telephone number being indicative of the PSTN telephone line via which the communication device can be reached.

35. The apparatus defined in claim 27, the controller being further adapted for:
 receiving information regarding an origin of the incoming call;
 wherein the voice message conveys said information regarding an origin of the incoming call.

36. The apparatus defined in claim 35, the voice-activated call handling functional unit being further adapted for formulating the voice message by text-to-speech conversion of said information regarding an origin of the incoming call.

37. The apparatus defined in claim 36, wherein said information regarding an origin of an incoming call is derived from CLID information.

38. The apparatus defined in claim 37, wherein said information regarding an origin of an incoming call comprises a telephone number.

39. The apparatus defined in claim 37, wherein said information regarding an origin of an incoming call comprises a name.

40. The apparatus defined in claim 35, wherein the incoming call originates from a calling party, the controller being further adapted for prompting the calling party to provide said information regarding an origin of the incoming call.

41. The apparatus defined in claim 27, the controller being further adapted for:
 receiving information regarding an origin of the incoming call;
 consulting a database to obtain information associated with said information regarding the origin of the incoming call;
 wherein the voice message conveys said associated information.

42. The apparatus defined in claim 41, wherein said associated information comprises text, the voice-activated call handling functional unit being further adapted for formulating the voice message by text-to-speech conversion of said associated information.

43. The apparatus defined in claim 41, wherein said associated information comprises a speech segment, the voice-activated call handing functional unit being further adapted for formulating the voice message by concatenating the speech segment with other speech segments.

44. The apparatus defined in claim 27, wherein the signal is produced by a microphone at the communication device and wherein, for determining, based on the signal, whether a spoken call handing command has been uttered, the voice-activated call handing functional unit is adapted for processing the signal in an attempt to detect a spoken call handling command potentially contained therein.

45. The apparatus defined in claim 44, wherein processing the signal comprises applying speech recognition to recognize one out of a plurality of possible spoken handling commands.

46. The apparatus defined in claim 44, the voice-activated call handling functional unit being further adapted for:
responsive to detection of a specific spoken call handling command in the signal, handling the incoming call in accordance with the specific spoken call handling command.

47. The apparatus defined in claim 46, wherein the incoming call originates from a calling party, wherein the specific spoken call handling command is a command to answer the call and wherein said handling the incoming call in accordance with the specific spoken call handling command comprises establishing a voice communication path between the calling party and the called party.

48. The apparatus defined in claim 46, wherein the incoming call originates from a calling party, wherein the specific spoken call handling command is a command to reject the call and wherein handling the incoming call in accordance with the specific spoken call handling command comprises signaling to the calling party that communication with the called party cannot be established.

49. The apparatus defined in claim 46, wherein the incoming call originates from a calling party, wherein the specific spoken call handling command is a command to forward the call to an entity other than the called party and wherein handling the incoming call in accordance with the specific spoken call handling command comprises establishing voice communication path between the calling party and the entity other than the called party.

50. The apparatus defined in claim 49, wherein the entity other than the called party is a voice mail system.

51. The apparatus defined in claim 27, the voice-activated call handling functional unit being further adapted for sending a signal to cause the communication device to acquire an off-hook state to allow the communication device to emit the voice message.

52. The apparatus defined in claim 27, the controller being further adapted for determining whether the called party subscribes to a service that enables calls to be handled by the called party in a touch-free manner.

53. The apparatus defined in claim 52, wherein causing the communication device to emit the voice message is performed only if said determining step is positive.

54. Network apparatus for touch-free incoming call handling by users of communication devices, the network apparatus comprising:
a) a switching/routing entity configured to communicate with the communication devices over a communications network; and
b) a controller configured to:
detect an incoming call destined for a particular one of the communication devices that is associated with a particular one of the users;
attempt to reach the particular user by sending a signal to the communication device over the communications network to cause the particular communication device to emit a voice message soliciting a spoken call handling command from the particular user;
receive a signal from the particular communication device;
determine, based on the signal received from the particular communication device, whether a spoken call handling command has been uttered at the particular communication device before the call being answered by the called party; and
upon determining that a spoken call handling command has been uttered, handle the incoming call in accordance with the spoken call handling command.

55. The network apparatus defined in claim 54, wherein the controller is configured to receive information regarding an origin of the incoming call, the voice message conveying the information regarding an origin of the incoming call.

56. The network apparatus defined in claim 55, wherein the controller is configured to formulate the voice message by text-to-speech conversion of the information regarding an origin of the incoming call.

57. The network apparatus defined in claim 55, wherein the information regarding an origin of an incoming call comprises a telephone number.

58. The network apparatus defined in claim 55, wherein the information regarding an origin of an incoming call comprises a name.

59. The network apparatus defined in claim 55, wherein the incoming call originates from a calling party, the controller being configured to prompt the calling party to provide the information regarding an origin of the incoming call.

60. The network apparatus defined in claim 54, wherein the controller is configured to:
receive information regarding an origin of the incoming call; and
consulting a database to obtain information associated with the information regarding an origin of the incoming call, the voice message conveying the information associated with the information regarding an origin of the incoming call.

61. The network apparatus defined in claim 54, wherein the signal is produced by a microphone at the communication device and wherein, to determine, based on the signal, whether a spoken call handling command has been uttered, the controller is configured to process the signal in an attempt to detect a spoken call handling command potentially contained therein.

62. The network apparatus defined in claim 61, wherein processing the signal comprises applying speech recognition to recognize one out of a plurality of possible spoken handling commands.

63. The network apparatus defined in claim 54, wherein the incoming call originates from a calling party and the spoken call handling command is a command to answer the incoming call, and wherein, to handle the incoming call in accordance with the spoken call handling command, the controller is configured to establish a voice communication path between the calling party and the particular user.

64. The network apparatus defined in claim 54, wherein the incoming call originates from a calling party and the spoken call handling command is a command to reject the incoming call, and wherein, to handle the incoming call in accordance with the spoken call handling command, the controller is configured to signal to the calling party that communication with the particular user cannot be established.

65. The network apparatus defined in claim 54, wherein the incoming call originates from a calling party and the spoken call handling command is a command to forward the incoming call to an entity other than the particular communication device, and wherein, to handle the incoming call in accordance with the spoken call handling command, the controller is configured to establish a voice communication path between the calling party and the entity other than the particular communication device.

66. The network apparatus defined in claim 65, wherein the entity other than the particular communication device is a voice mail system.

67. The network apparatus defined in claim 54, wherein the controller is configured to send a signal to cause the particular communication device to acquire an off-hook state to allow the particular communication device to emit the voice message.

68. The network apparatus defined in claim 54, wherein, to cause the particular communication device to emit the voice message, the controller is configured to send a signal conveying the voice message to the particular communication device.

69. The network apparatus defined in claim 54, wherein, to cause the particular communication device to emit the voice message, the controller is configured to send a trigger to the communication device that is recognized by the particular communication device as being associated with the voice message to be emitted.

70. A method of handling incoming calls destined for a called party, the called party being associated with a communication device, said method being implemented by a network entity connected to the communication device via a communications network, said method comprising:

- detecting arrival of an incoming call destined for the called party;
- attempting to reach the called party by causing the communication device to emit a voice message soliciting a spoken call handling command from the called party;
- receiving a signal from the communication device;
- at the network entity, determining, based on the signal received from the communication device, whether a spoken call handling command has been uttered at the communication device before the call being answered by the called party; and
- determining whether the called party subscribes to a service that enables calls to be handled by the called party in a touch-free manner.

* * * * *